(12) United States Patent
Kuriyama et al.

(10) Patent No.: US 6,789,723 B2
(45) Date of Patent: Sep. 14, 2004

(54) WELDING PROCESS FOR TI MATERIAL AND CU MATERIAL, AND A BACKING PLATE FOR A SPUTTERING TARGET

(75) Inventors: Kazuya Kuriyama, Osaka (JP); Takayuki Furukoshi, Osaka (JP); Youichi Yasue, Osaka (JP)

(73) Assignee: Komatsu, Ltd., Tokyo (JP)

(*) Notice: Subject to any disclaimer, the term of this patent is extended or adjusted under 35 U.S.C. 154(b) by 0 days.

(21) Appl. No.: 09/160,665

(22) Filed: Sep. 25, 1998

(65) Prior Publication Data

US 2001/0048020 A1 Dec. 6, 2001

(30) Foreign Application Priority Data

Sep. 26, 1997 (JP) .............................................. 9-279496

(51) Int. Cl.[7] .................................................. B23K 1/20
(52) U.S. Cl. ...................... 228/203; 228/208; 228/262.6
(58) Field of Search ................................ 228/203, 208, 228/220, 221, 262.6, 262.61

(56) References Cited

U.S. PATENT DOCUMENTS 3,991,929 A * 11/1976 Smith .......................... 228/208
4,411,762 A * 10/1983 Kline ...................... 204/290 F
4,715,525 A * 12/1987 Norris ......................... 228/194

* cited by examiner

Primary Examiner—M. Alexandra Elve
(74) Attorney, Agent, or Firm—Darby & Darby

(57) ABSTRACT

A welding process for welding a Cu material to a Ti material includes interposing a tertiary component between the Ti material and the Cu material. The tertiary component is of a type of metal that, with Cu, forms a compound which is liquified at a temperature below the eutectic temperature of Ti and Cu. The above materials are heated and welded at temperature of (700 through 887° C.). The temperature selected is below the eutectic temperature of the Ti and Cu. The finished material forms a sputtering backing plate for a sputtering. A target member, bonded to the Cu material side of the backing plate, completes the sputtering target. In one embodiment, the proportion of the tertiary metal is achieved by controlling a thickness of the tertiary metal deposited on the Cu material. In another embodiment, the proportion of the tertiary metal is achieved by controlling the thickness of a layer of powder of the tertiary material deposited between the Cu and Ti materials.

16 Claims, 3 Drawing Sheets

×2

×200

WELDING PROCESS FOR TI MATERIAL AND CU MATERIAL, AND A BACKING PLATE FOR A SPUTTERING TARGET

BACKGROUND OF THE INVENTION

Field of the Invention

The present invention relates to a welding process for a titanium material (hereinafter referred to as Ti) and a copper (hereinafter referred to as Cu) material. This invention also relates to a sputtering target or a backing plate for use in a sputtering target, based on a Ti—Cu composite plate welded by the aforementioned welding process.

The sputtering process is well known for forming a thin film to be used on an integrated circuit. A sputtering target is used in processes of physical sputtering (PVD) and reactive sputtering. The sputtering target is composed of a target member upon which ions are impacted, and a backing plate at its rear for supporting the target member. Concretely, it is known that a target member composed of a chromium (hereinafter referred to as Cr) material, a Ti material or an Al material is bonded (brazed) with an indium (hereinafter referred to as In) material, on a backing plate composed of a Cu material, a Ti material or an aluminum (hereinafter referred to as Al) material.

For example, it is disclosed in Japanese patent Application Laid-Open No. 6-293963 that a Ti material is used as the backing plate.

It is disclosed in Japanese Patent Application Laid-Open No. 6-293963 and Japanese patent Application Laid-Open No. 3-140464 that the bonding of the target member is conducted by using the In material.

The target member is bonded using an In material as a solder with the aforementioned Ti material being used as a backing plate. The surface of the Ti material is covered with a strong thin oxide film (passive state film) due to exposure to atmosphere, moisture and so on. This passive state film is so strong that it is extremely difficult to remove. It is hard to react to other metals so that wettability of the Ti surface is so poor that it extremely difficult to conduct bonding operations using. Wettability is the extent to which a solid is wetted by a liquid, measured by the force of adhesion between the solid and the liquid. In order to avoid such difficulty, in the aforementioned Japanese Patent Application Laid-Open No. 6-293963, the Cu is thermally sprayed (sprayed as a liquid) upon the surface of the backing plate made of the Ti material, to thereby improve the wettability of the In material. Thermal spraying with Cu substantially increases the manufacturing cost of the sputtering target.

The same problem is caused even in the recycling of the sputtering target when the target member is removed from the used sputtering target, and used again with a new target member bonded to the backing plate. In the Japanese Patent Application Laid-Open No. 6-116706, surface processing of the Ti material is proposed which consists of heating about one hour at 700° C. in vacuum, with the Ti material coated with, for example, Cu powder, so as to improve the adherence strength by diffusing the Cu on the surface of the Ti. The reaction layer is fragile because it is, at most, several $\mu$ thick, and because the reaction takes place in a solid phase. Thus, it is necessary to again conduct surface processing for recycling the sputtering target.

When Ti material is used as the backing plate, it is preferable to have the Cu material welded on the surface to improve the wettability during bonding of the target member. In this case, it is important to establish a welding process capable of welding with high quality and low cost. The same thing can be said also in using the Cu material as the backing plate, and the Ti material as the target member. When the backing plate and the target member are both composed of a Ti material, it is helpful in practical use when both can be welded through the Cu material.

The inventors conducted various tests using the eutectic reaction of the Ti—Cu in connection with the welding property between the Ti material and the Cu material. In the test 1, a Cu foil of 2 mm thickness was placed on the Ti material to conduct 30 minutes heating (non-pressure) at 850° C. lower than the eutectic temperature (887 C) of the Ti—Cu. As the result, the reaction of the Ti—Cu was observed only in the portion of 20% in the area ratio, with remaining 80% remaining unreactive. Thus, according to the welding method, an object of obtaining the better welding result cannot be achieved. As the test 2, 30 minutes heating was conducted at 900° C. higher than the aforementioned eutectic temperature with a welding Cu plate of 2 mm thickness being placed between the Ti material and the Cu material. As the result, as shown in FIG. 1, a, $Ti_2Cu$ layer, TiCu layer were mixed in spots on the Ti material, with the welding Cu plate being completely molten.

As described above, in the prior art process of forming the Cu welding portion by using the eutectic reaction of the Ti—Cu, uniformity of the reaction cannot be obtained in a temperature area lower than the eutectic temperature, thus it is not possible to have homogeneous welding. When the processing operation is conducted at a temperature region higher than the eutectic temperature to obtain uniformity of the reaction, the liquid phase occurs too rapidly, and the reaction between the Ti and the Cu also are promoted rapidly. The liquid phase increases until the Cu completes the reaction with considerable penetration of the Ti into the liquid phase including the Cu. As a result extremely fragile intermetallic compounds ($Ti_2Cu$, TiCu) exist in the welding region in amounts that degrade welding quality.

OBJECTS AND SUMMARY OF THE INVENTION

This invention is provided to overcome the aforementioned defects.

An object of this invention is to provide a welding process between a Ti material and a Cu material capable of better welding quality.

Another object of this invention is to provide a Ti—Cu composite plate improved as described above.

A still further object of this invention is to provide a sputtering target which reduces manufacturing cost by using the composite plate as a backing plate of a sputtering target.

A further object of this invention is to reduce the recycle cost of the sputtering target.

Briefly stated, the present invention provides a welding process for welding a Cu material to a Ti material which includes interposing a tertiary component between the Ti material and the Cu material. The tertiary component is of a type of metal that, with Cu, forms a compound which is liquified at a temperature below the eutectic temperature of Ti and Cu. The above materials are heated and welded at temperature of (700 through 887° C.). The temperature selected is below the eutectic temperature of the Ti and Cu. The finished material forms a sputtering backing plate for a sputtering. A target member, bonded to the Cu material side of the backing plate, completes the sputtering target. In one embodiment, the proportion of the tertiary metal is achieved by controlling a thickness of the tertiary metal deposited on the Cu material. In another embodiment, the proportion of the tertiary metal is achieved by controlling the thickness of a layer of powder of the tertiary material deposited between the Cu and Ti materials.

According to an embodiment of the invention, there is provided a process for welding a Ti material and a Cu material comprising. interposing a welding Cu material, including a tertiary metal as a component, between a Ti material and a Cu material, said tertiary material being of a type which performs one of the following:

reduces a three-element eutectic temperature of the Ti, the Cu and said tertiary metal below a eutectic temperature of said Ti and the Cu; and produces a reaction which causes a liquid phase at a temperature that is lower than a two-element eutectic temperature between the Ti material and the Cu material, heating the Ti material and the Cu material to said temperature wherein solid and liquid coexist; and maintaining said temperature long enough to form a welding portion.

According to a feature of the invention, there is provided a Ti—Cu composite plate having a welding portion formed by the process of the preceding paragraph.

According to a further feature of the invention, there is provided a process for forming a plate including interposing a tertiary metal between a Cu material and a Ti material, said tertiary metal being of a type which reacts with at least one of Cu and Ti to reduce a melting temperature below a temperature of an eutectic temperature of said Cu and Ti material, and holding said materials at said temperature for a time sufficient to obtain welding.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
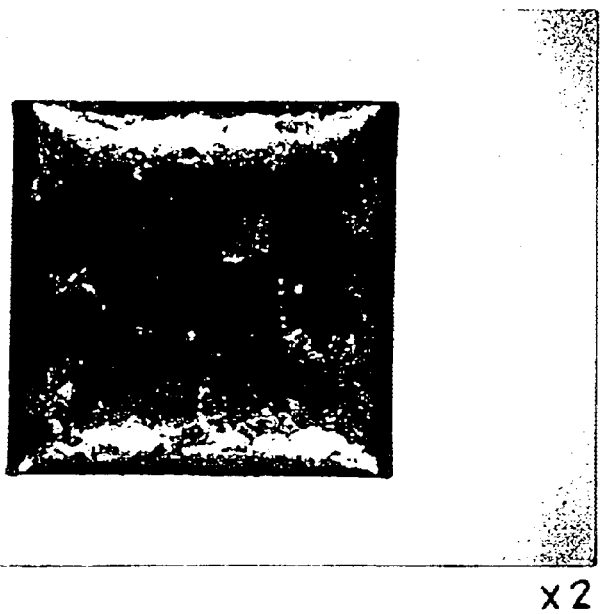
FIG. 1 shows a microphotograph of a metallic structure in the welding portion of a test piece obtained by reaction of the Cu and Ti at an eutectic temperature or higher.

A process for welding a Ti material and a Cu material comprises the steps of interposing a Cu material including a tertiary metal as a component so that a three-element eutectic temperature of the Ti, Cu and the tertiary metal other than Ti and the Cu or another reacting liquid phase generating temperature is lowered to a value below the two-element eutectic temperature of the Ti material and the Cu material, between the Ti material and the Cu material, heating the Ti material and the Cu material the above temperature lower than the two-element eutectic temperature, but higher than the three-element eutectic temperature, and thus forming a welding portion with the Ti, Cu and the tertiary metal as components at the interface by the reaction of the materials.

The Ti material to be used in the above description includes pure Ti for industry use, and Ti alloy for industry use. Concretely there can be Ti-5Al-2.5Sn (residue is inevitable impurities and Ti by weight %, hereinafter the same) Ti-6Al-4Zr-1V, Ti-8Al-1Mo-1V, Ti-8Al-12Zr, Ti-3Al-2.5V, Ti-8Mn, Ti-4Al-4Ti-6Al-4V, Ti-7Al-4Mo, Ti-3Al-1-11Cr-13V and soon. The Cu material includes pure Cu for industry and Cu alloy for industry. Concretely, the Cu material can include Cu alloy of a welding temperature or more of this invention, namely, bronze, brass and so on.

Generally, the three-element eutectic temperature of three types of metals A, B and C are lower without fail than any of the two-element eutectic temperature of the combinations of metals A, B and metals B, C or metals C, A. The three element eutectic temperature of the Ti, Cu and Sn, where tin (hereinafter referred to as Sn) is used as a tertiary metal in the invention, is lower than the two-element eutectic temperature of the Ti and the Cu. When the Ti material and the Cu material are heated higher than the three-element eutectic temperature, and lower than the two-element eutectic temperature, the liquid phase of the welding material is caused between the Ti material and the Cu material, thus avoiding the reaction progressing between the Ti and the Cu being progressed rapidly. The uniform contact condition is formed between the Ti material and the Cu material, by the surface tension, because of the existence of such liquid phase. Penetration of the Ti into the solution of the Cu and the Sn, and the solid phase diffusing reaction of the Cu and the Sn, i.e., solution component to the Ti is caused in a temperature region below the two element eutectic temperature. Thus, the reaction between the Ti and the Cu is permitted to proceed at a uniform and gentle speed through the liquid phase between the Ti material and the Cu material, thus uniformly causing a better welding portion including rich Cu between the Ti material and the Cu material. In order to produce the liquid phase lower than two-element eutectic temperature of the Ti and the Cu, other reactions, other than the eutectic reaction can be used.

Although the heating can be conducted in the ambient atmosphere, it is preferable to conduct the heating in non-oxide atmosphere such as vacuum, inert gas, reducing gas or the like. This is desirable because it produces a weld of improved quality by positively avoiding the formation of an oxide film at the welding portion during the heating operation.

Any tertiary metal for the welding Cu material is satisfactory if it produces a liquid phase in an eutectic reaction temperature or another reaction with the Ti, Cu and the tertiary metal. The three-element eutectic temperature of the Ti, Cu and the tertiary metal is always lower than the two eutectic temperature of the Ti and Cu, taken alone, as described above. But the welding Cu material including the Sn as the tertiary metal should preferably be used. It is easier to control the heating temperature, because the three-element eutectic temperature of the Ti, Cu, Sn is substantially lower than the two-element eutectic temperature of the Ti and Cu. When a welding Cu material including Sn is used, the heating temperature in the welding process should be preferable to be about 700° C. through 887° C. as in the claim 4. At approximately 700° C. or less, the Sn amount must be at least 50 wt % to produce the liquid phase between the Ti material and the Cu material.

If the amount of Sn exceeds about 50 weight %, the welding strength is reduced. If the welding temperature exceeds the eutectic temperature (887° C.) of Ti Cu, it is difficult to form a welding portion having rich-Cu, as descrited above.

The welding portion to be produced by the welding method, with Cu as main body, includes approximately 60 by weight % or more preferably of Cu.

A welding layer of Cu material of, for example, approximately 1 mm thickness, is preferred. It is preferable to use a foil or powder of Cu material. By doing this, distortion of the welded material, caused by the difference in the thermal coefficient of expansion between the Ti and Cu is avoided during cooling. process that follows the heating operation. The welding Cu material, may be a Cu foil on which the tertiary metal such as Sn or the like is plated. This gives the advantage that the component ratios between the Cu and the third component is easily changed by controlling the thickness of the plating layer. The term "including the tertiary metal as the component" may be interpreted to mean such plating with the tertiary metal as described above. The same can be defined in the joining use of the Cu foil, and the Sn powder.

According of the welding method of Ti material and Cu material, a satisfactory welding portion is obtained at lower cost and with considerably improved uniformity and strength of the welding coating.

A Ti—Cu composite plate provided with a good quality of welding portion including rich Cu obtained in accordance with the invention. When the plate is used as the sputtering target, the film product quality is improved and the possible peeling or flaking of the target material is reduced, because the welding portion is extremely uniform and good.

When the Ti—Cu composite plate is used as backing plate, the wettability on the surface to the bonding material of the In material or the like is improved by the Cu material. As the result, the film quality is improved and peeling or flaking of the target member is reduced due to improved homogeneity and improved bonding. In a sputtering target using these backing plates, the Cu material remains on the surface even when bonding a new target member by cutting, removing the used target member after the sputtering operation is done, the bonding using the In material as it is can be done without doing the preliminary operation or the like. As this result, it is possible to considerably reduce the recycle cost of the sputtering target.

The aforementioned welding process can weld, for example, a Cu plate to a Ti plate by using the intermediate welding Cu material with the tertiary metal. That is, when the Ti material is used as the sputtering target, and the Cu material is used as the backing plate, the two materials are welded by bonding with an intermediate layer of In. Both can be welded in the present process. The present process exhibits extremely high welding strength as compared with the bonding strength of the In to be described later.

The improved bonding is useful in resisting distortion, peeling and flaking in the presence of high water pressure in the cooling channels of the backing plate. The bonding is further improved by the reduced distortion by the reduction in thermal distortion occurring during cooling of the backing plates of the prior art. Such reduced distortion reduces the possibility of the Cu layer peeling or flaking from the Ti layer. Even when the Cu material is used as the sputtering target, and the Ti material is used as the backing plate, exactly the same effect can be expected.

Embodiment 1

A Cu-20Sn (by weight %, hereinafter the same) foil of 25 μm thickness was placed between a Ti plate and a Cu plate. The result was maintained at 800° C. temperature for about thirty minutes in a vacuum atmosphere of $10^{-4}$ Torr.

An analysis of the resulting welded region indicated the following layered composition, proceeding from the pure Ti side to the pure Cu side:

First layer, adjacent the Ti plate, in weight %:

30% Cu, 5% Sn, 65% Ti

Second layer on the first layer is a 10 μm thick layer, in weight %:

6% Cu, 60% Sn, 33% Ti

Third and final layer, between the second layer and the Cu plate, is a 25 μm layer, in weight %:

a solid solution of 75% Cu, 25% Sn

From the foregoing, it was found that the welding portion was rich in Cu. In this embodiment, the welding portion was occupied 100% of the area ratio. In the prior art using only Cu and Ti, without the intermediate tertiary metal, the welding portion occupied only about 15 to 20% at the area ratio.

Embodiment 2

Figure 2:
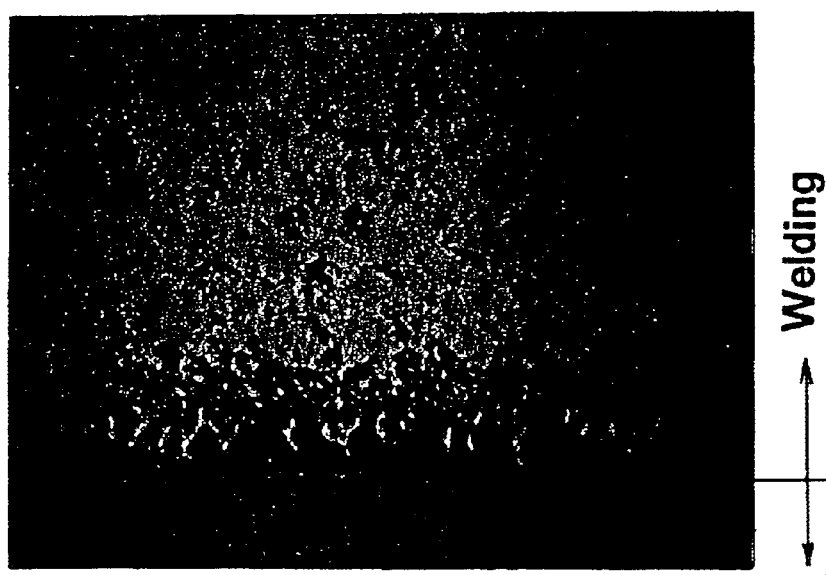
FIG. 2 shows a microphotograph of a metallic structure of the welding portion obtained in a second embodiment of the invention.
Figure 3:
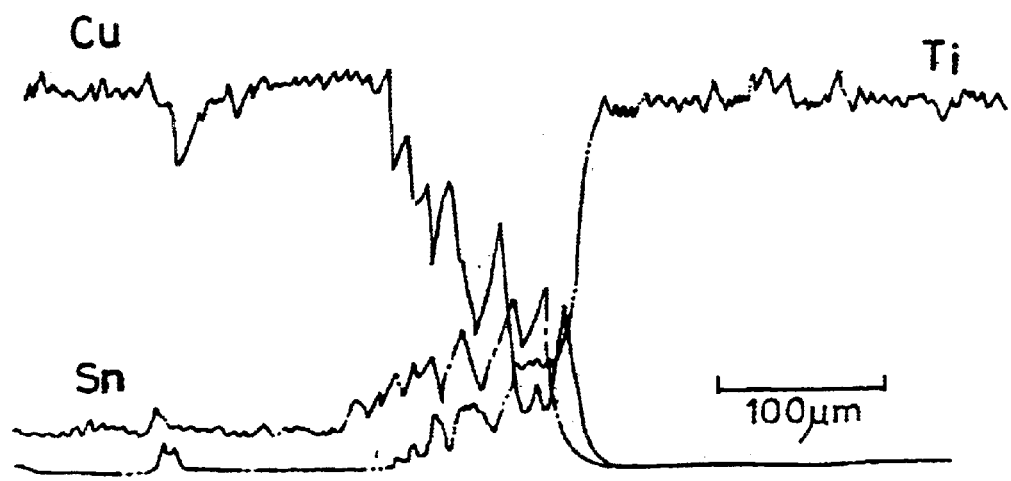
FIG. 3 is a graph showing a component distributing condition near the welding portion obtained in the second embodiment.

A powder of 80% Cu and 20% Sn was applied in a 0.5 mm thickness layer on the surface of a Ti plate. A Cu foil of 70 μm was placed over the surface of the powder. Dead weights of 5 g/cm$^2$ were disposed equally on the foil. This product was maintained for about 30 minutes at the temperature of 800° C. in a vacuum atmosphere of $10^{-4}$ Torr. A microphotograph of the metallic structure close to the welding portion obtained is shown in FIG. 2. The component distribution (line scan) of the Ti, Cu, and Sn on the line from the Ti base material to the welding portion is shown in FIG. 3. An improved welding condition is obtained as shown in the drawing. Also, each component exhibits better diffusion condition.

As the result, uniform Cu foils were welded on the Ti plate, thus eliminating the need for the step of thermal spraying of a coating of Cu for soldering to the In.

Further, the thickness of the Cu foil could be variably changed, thus improving the recycle property considerably. (Japanese Patent Application Laid-Open No. 9-115306)

Embodiment 3

Figure 4:
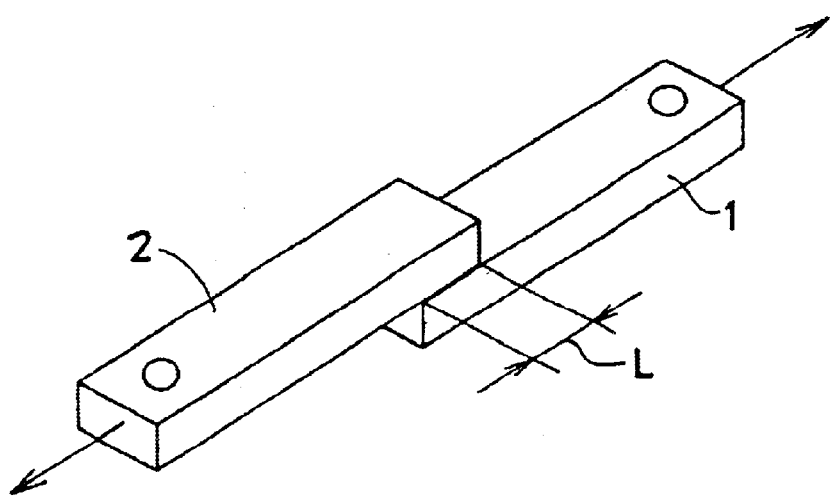
FIG. 4 is an illustrating view of a test piece used in a third embodiment of the invention.

Referring to FIG. 4, a Cu/Sn powder of between 20% and 33% Sn powder interposed between a Ti plate (30 mm wide×135 mm long×10 mm thick) 1 and a Cu plate (30 mm wide×135 mm long×10 mm thick) 2 to join them. Plates 1 and 2 was placed as shown in FIG. 4, with the length L of the welding portion between them being 30 mm. The welding temperatures were variably changed while maintaining a powder coating thickness of 0.5 mm in the coating thickness of the powder, in a vacuum atmosphere of $10^{-4}$ Torr. The welding time was respectively 30 minutes.

Figure 5:
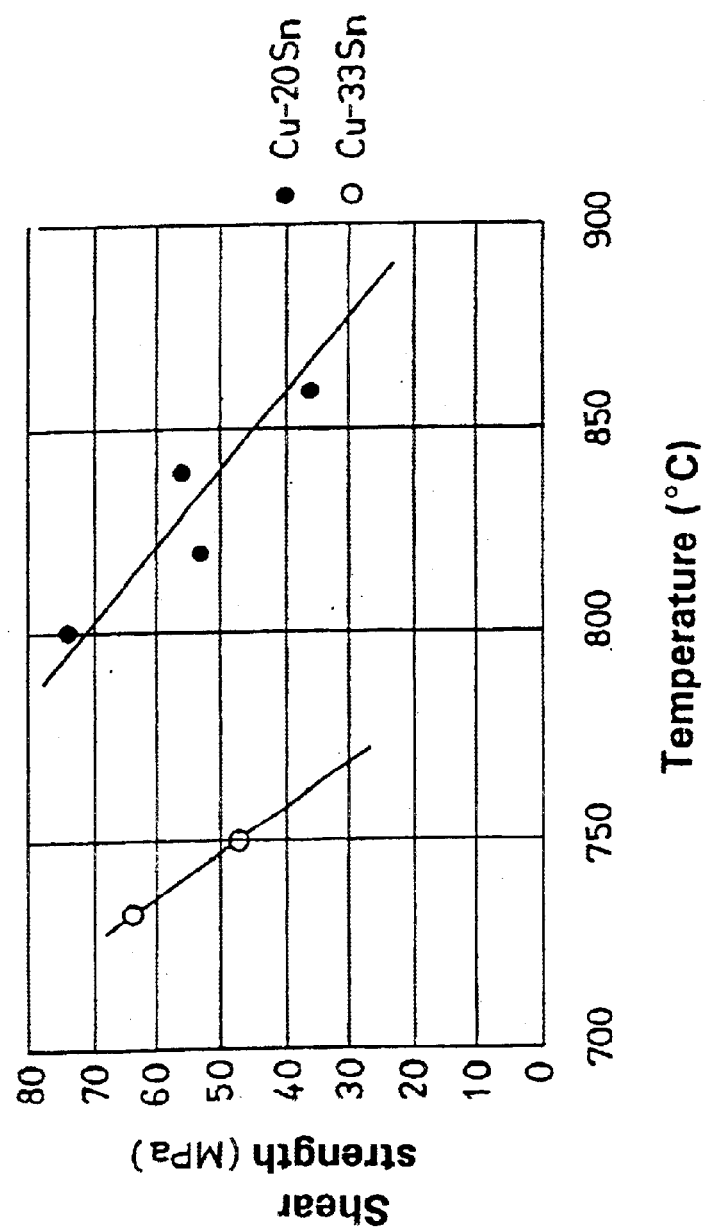
FIG. 5 is a graph showing the relationship between the welding temperature obtained in the third embodiment and the shearing strength.

A shearing test of the welding test piece obtained by the aforementioned description was conducted. The result was shown in FIG. 5 where better welding strength was obtained in either case. The shearing strength was seen to be lowered with increasing welding temperature. This is believed due to an increase in the remaining amount of the intermetallic compounds (Ti$_2$Cu, TiCu) in the welding portion, because the of progress of the liquid phase of the welding portion.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A process for welding a Ti material and a Cu material comprising:

interposing a welding Cu material, including a tertiary metal as a component, between a Ti material and a Cu material;

said tertiary metal being of a type which:
(i) reduces three-element eutectic temperature of the Ti, the Cu and said tertiary metal below a eutectic temperature of said Ti and the Cu; or
(ii) results in the formation of a liquid phase at a temperature that is lower than a two-element eutectic temperature between the Ti material an the Cu material;

heating said Ti material and the Cu material to a temperature wherein solid and liquid coexist and lower than a two-element eutectic temperature of the Ti material and the Cu material; and maintaining said temperature wherein solid and liquid coexist long enough to form a welding portion.

2. A welding process of a Ti material and a Cu material according to claim 1, wherein the step of heating includes heating in a non-oxidizing atmosphere selected from a vacuum, an inert gas, or a reducing gas.

3. A welding process of a Ti material and a Cu material according to claim 1, wherein said tertiary metal is Sn.

4. A welding process of a Ti material and a Cu material according to claim 3, where said temperature wherein solid and liquid coexist is from about 700° C. to about 887° C.

5. A welding process of a Ti material and a Cu material according to claim 4, wherein a welding portion formed has Cu as a main body.

6. A welding process of a Ti material and a Cu material according to claim 5, wherein a welding portion formed includes at least 60 weight % Cu.

7. A welding process of a Ti material and a Cu material according to claim 1, wherein said welding Cu material is a foil or powder.

8. A welding process of a Ti material and a Cu material according to claim 1, wherein the welding Cu material is composed of a plating of said tertiary metal on a Cu foil.

9. A process for forming a plate including:

interposing a tertiary metal between a Cu material and a Ti material;

said tertiary metal begin of a type which results in the formation of a liquid phase at a temperature below an eutectic temperature of said Cu and Ti material; and holding said materials at a temperature wherein solid and liquid coexist and lower than a two-element eutectic temperature of the Ti material an the Cu material for a time sufficient to obtain welding.

10. A welding process of a Ti material and a Cu material according to claim 6, wherein said welding Cu material is a foil or a powder.

11. A welding process of a Ti material and a Cu material according to claim 6, wherein the welding Cu material s composed of plating of and tertiary metal on a Cu foil.

12. A welding process comprising:

interposing a foil or powder between a Ti material and a Cu material, wherein the foil or powder comprises Sn, heating the Ti material and the Cu material to a temperature wherein solid and liquid coexist and lower than a two-element eutectic temperature of the Ti material and the Cu material; and maintaining said temperature long enough to form welding portion.

13. The welding process of claim 12, wherein the heating occurs in a vacuum, in the presence of an inert gas, or in the presence of a reducing gas.

14. The welding process of claim 12, wherein the foil further comprises Cu.

15. The welding process of claim 12, the powder is interposed between a Ti plate and a Cu foil.

16. The welding process of claim 12, wherein the powder is interposed between a Ti plate and a Cu plate.

* * * * *